(12) United States Patent
Walker (10) Patent No.: US 10,100,844 B2
(45) Date of Patent: Oct. 16, 2018

(54) MULTI-STAGE-TYPE COMPRESSOR AND GAS TURBINE EQUIPPED THEREWITH

(71) Applicant: MITSUBISHI HEAVY INDUSTRIES, LTD., Tokyo (JP)

(72) Inventor: Thomas Walker, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 342 days.

(21) Appl. No.: 14/896,771

(22) PCT Filed: Feb. 5, 2014

(86) PCT No.: PCT/JP2014/052640
§ 371 (c)(1),
(2) Date: Dec. 8, 2015

(87) PCT Pub. No.: WO2015/056454
PCT Pub. Date: Apr. 23, 2015

(65) Prior Publication Data
US 2016/0131158 A1    May 12, 2016

(30) Foreign Application Priority Data
Oct. 17, 2013 (JP) .................. 2013-216689

(51) Int. Cl.
*F02C 6/08* (2006.01)
*F04D 29/54* (2006.01)
(Continued)

(52) U.S. Cl.
CPC ............ *F04D 29/545* (2013.01); *F02C 3/045* (2013.01); *F02C 6/08* (2013.01); *F04D 19/02* (2013.01);
(Continued)

(58) Field of Classification Search
CPC ...... F02C 6/08; F04D 27/023; F04D 27/0223; F04D 29/545; F04D 29/526
See application file for complete search history.

(56) References Cited

U.S. PATENT DOCUMENTS 5,209,633 A    5/1993    McGreehan et al.
7,549,838 B2   6/2009    Touyeras
(Continued)

FOREIGN PATENT DOCUMENTS

JP    63-85299    4/1988
JP    7-63199     3/1995
(Continued)

OTHER PUBLICATIONS

International Search Report dated May 13, 2014 in corresponding International Application No. PCT/JP2014/052640.
(Continued)

*Primary Examiner* — Carlos A Rivera
(74) *Attorney, Agent, or Firm* — Wenderoth, Lind & Ponack, L.L.P.

(57) ABSTRACT

This compressor is provided with: a rotor casing that encircles a rotor, which rotates around a rotational axis; an air bleed chamber casing that is provided to the outer peripheral side of the rotor casing and demarcates an air bleed chamber interconnecting to a primary duct via a slot; and an air bleed tube that is connected to the air bleed chamber casing from the outer peripheral side and is provided with an air bleed pathway. In the slot, at which an opening to the primary duct is formed, a large opening, at which the opening area of the opening is locally larger than that of the other positions in the peripheral direction of the opening, is formed at a position in the peripheral direction corresponding to the position at which the air bleed tube is provided.

4 Claims, 4 Drawing Sheets

(51) Int. Cl.
*F02C 3/045* (2006.01)
*F04D 19/02* (2006.01)
(52) U.S. Cl.
CPC ...... *F04D 29/541* (2013.01); *F05D 2250/181* (2013.01); *F05D 2250/182* (2013.01); *F05D 2250/183* (2013.01)

(56) References Cited

U.S. PATENT DOCUMENTS

| | | | |
|---|---|---|---|
| 8,388,308 B2 | 3/2013 | Karafillis et al. | |
| 2009/0297335 A1* | 12/2009 | Karafillis | F01D 17/105 415/115 |

FOREIGN PATENT DOCUMENTS

| | | |
|---|---|---|
| JP | 2009-108861 | 5/2009 |
| JP | 2011-236801 | 11/2011 |
| JP | 2013-72418 | 4/2013 |
| JP | 2013-92124 | 5/2013 |
| JP | 2015-78662 | 4/2015 |

OTHER PUBLICATIONS

Written Opinion of the International Searching Authority dated May 13, 2014 in corresponding International Application No. PCT/JP2014/052640.
Sascha Pönick et al., "Numerical and Experimental Investigations of a Compressor Cascade Flow With Secondary Air Removal", Proceedings of ASME Turbo Expo 2011, GT2011, GT2011-45202, Jun. 6-10, 2011, Vancouver, British Columbia, Canada, pp. 1-2.

* cited by examiner

MULTI-STAGE-TYPE COMPRESSOR AND GAS TURBINE EQUIPPED THEREWITH

TECHNICAL FIELD

The present invention relates to a compressor including a rotor that rotates around an axis and a casing that encircles the rotor, and a gas turbine including the compressor.

Priority is claimed on Japanese Patent Application No. 2013-216689, filed Oct. 17, 2013, the content of which is incorporated herein by reference.

BACKGROUND ART

There are known compressors which include a rotor that is provided in a gas turbine or the like and rotates around an axis, and a casing that encircles the rotor from an outer peripheral side and which compresses fluids, such as air. An air bleed structure for leading a portion of the compressed fluid to the outside is used for the compressors.

PTL 1 discloses an air bleed structure in which the shape of the section of a communication flow path (bleed passage) provided between a bleed slot and an air bleed chamber (bleed cavity) in the air bleed structure is changed to match the arrangement or shape of an air bleed tube (bleed port) in a peripheral direction.

In the air bleed structure, the arrangement of the above-described air bleed tube and the bled fluid have a swirling component in the peripheral direction accompanied with the rotation of the rotor. Thus, the flow rate of the fluid increases at the position in the peripheral direction of the communication flow path corresponding to the position where the air bleed tube is provided. When the flow rate of this fluid increases, it is confirmed from analysis using Computational Fluid Dynamics (CFD) that the non-uniformity of the flow rate distribution in the peripheral direction becomes large within the primary duct.

Depending on such nonuniform flow rate distribution, pulsation occurs, speed loss occurs in the vicinity of the tips of compressor blades arranged downstream from a bleed slot, and surging is caused in the entire flow of the compressed air.

The operation efficiency of the compressor may decline due to such speed loss and surging.

Particularly, when the number of air bleed tubes decreases from the purpose of weight reduction, or the like, the nonuniformity of the flow rate becomes larger and a surge margin becomes smaller. As a result, the possibility of the occurrence of the surging becomes higher.

CITATION LIST

Patent Literature
[PTL 1]: Specification of U.S. Pat. No. 8,388,308

SUMMARY OF INVENTION

Technical Problem

In the communication flow path of PTL 1, the flow rate distribution in the peripheral direction is made uniform by changing the shape of the section of the communication flow path in the peripheral direction as described above. However, as for the cross-sectional shape of the communication flow path, the flow path width becomes narrow or becomes wide at a halfway position of the above communication flow path, and a very complicated shape is formed. For this reason, costs required for manufacturing increase.

The invention provides a compressor that can make the flow rate of a fluid uniform within a primary duct in the vicinity of a slot where the bleeding of a fluid from the primary duct is performed, while controlling costs, and can increase a surge margin to improve operation efficiency, and a gas turbine provided therewith.

Solution to Problem

According to a first aspect of the invention, there is provided a compressor including: a rotor that rotates around an axis; a rotor casing that encircles a rotor from an outer peripheral side and demarcates a primary duct for a liquid between the rotor casing and the rotor; an air bleed chamber casing that is provided on the outer peripheral side of the rotor casing and demarcates an air bleed chamber communicating with the primary duct via a slot formed extending in a peripheral direction of the axis; and a tube that is connected to the air bleed chamber casing from the outer peripheral side, and has an air bleed pathway leading the liquid within the air bleed chamber to the outside formed therein. In the slot where an opening to the primary duct is formed, a large opening, in which the opening area of the opening is locally larger than that at the other positions in the peripheral direction of the opening, is formed at a position in the peripheral direction corresponding to a position where the tube is provided.

According to such a compressor, by forming the large opening in the opening of the slot, the flow rate of the fluid to flow from the slot toward the air bleed pathway of the tube in this portion can be suppressed to be small. Accordingly, an increase in the flow rate of the fluid resulting from the rotation of the rotor can be suppressed within the primary duct in the vicinity of the opening of the slot, at the position in the peripheral direction of the opening corresponding to the position where the tube is provided. Additionally, the large opening is formed in the opening of the slot to the primary duct. Hence, since the large opening can be formed at a position that is easy to access from the inner peripheral side of the rotor casing, manufacturing is easy.

Additionally, the large opening may be formed in the slot at the position in the peripheral direction of the opening corresponding to the position where the tube is provided and on a first side in a rotational direction of the rotor at the position in the peripheral direction of the opening.

The flow rate of the fluid to flow toward the air bleed pathway of the tube from the slot under the influence of the rotation of the rotor increases on the first side in the rotational direction of the rotor at the position in the peripheral direction of the opening corresponding to the position where the tube is provided. Hence, the large opening is formed on the first side in the rotational direction of the rotor at the position in the peripheral direction of the opening corresponding to the position where the tube is provided, and thereby, the large opening is formed at the position where the flow rate of the fluid increases. For this reason, it is possible to more effectively make the distribution of the flow rate of the fluid in the peripheral direction uniform in the vicinity of the opening of the slot.

Moreover, the slot may be formed such that the opening area decreases gradually toward the first side in the rotational direction of the rotor from the large opening.

The flow rate of the fluid to flow from the slot via the air bleed chamber toward the air bleed pathway of the tube becomes the largest at the position in the peripheral direction of the opening where the tube is provided. Additionally, the flow rate of the fluid to flow toward the air bleed pathway becomes smaller as it goes from the position in the peripheral direction of the opening where the tube is provided toward the first side in the rotational direction. Therefore, it is possible to reduce the opening area of the slot from the large opening toward the first side in the rotational direction so as to match such flow rate distribution, thereby more effectively making the distribution of the flow rate of the fluid in the peripheral direction uniform in the vicinity of the opening of the slot.

According to a second aspect of the invention, there is provided a gas turbine including: the above compressor that compresses air as the fluid when the rotor rotates; a combustor that combusts fuel in the compressed air compressed in the compressor to generate combustion gas; and a turbine that is driven with the combustion gas from the combustor.

According to such a gas turbine, the compressor is included. Thus, an increase in the flow rate of the fluid resulting from the rotation of the rotor can be suppressed within the primary duct in the vicinity of the opening of the slot, at the position in the peripheral direction of the opening corresponding to the position where the tube is provided. Additionally, the large opening is formed in the opening of the slot to the primary duct. Hence, since the large opening can be formed at a position that is easy to access from the inner peripheral side of the rotor casing, manufacturing is easy.

Advantageous Effects of Invention

According to the above compressor and gas turbine, the large opening is formed in the opening of the slot. Thus, it is possible to make the distribution of the flow rate of the fluid in the peripheral direction uniform within the primary duct in the vicinity of the slot where the bleeding of the fluid from the primary duct is performed, while controlling costs, and to increase a surge margin to improve operation efficiency.

DESCRIPTION OF EMBODIMENTS

First Embodiment

Hereinafter, an axial compressor 1 related to a first embodiment of the invention will be described.

First, a gas turbine 200 including the compressor 1 will be described.

Figure 1:
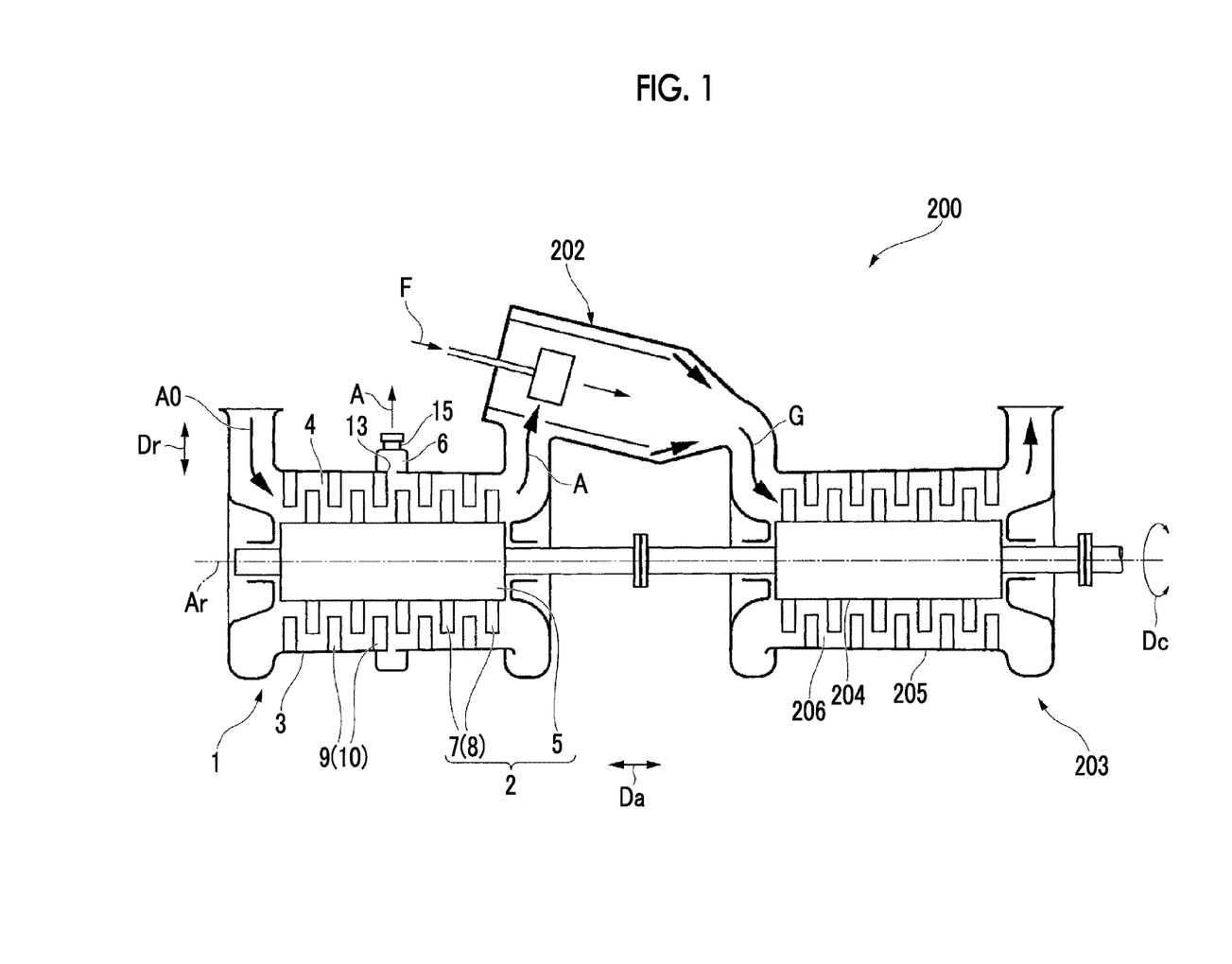
FIG. 1 is a schematic side view of a gas turbine including a compressor related to a first embodiment of the invention.

As illustrated in FIG. 1, the gas turbine 200 includes the compressor 1 that compresses external air A0 to generate compressed air A, a plurality of combustors 202 that mix and combust fuel F supplied from a fuel supply source with the compressed air A to generate combustion gas G, and a turbine 203 that is driven with the combustion gas G. In addition, in the following, the compressed air A is referred to as air A.

The turbine 203 has a turbine rotor 204 that rotates around a rotational axis Ar, and a tubular casing 205 that covers the turbine rotor 204. A primary duct 206 is demarcated between the turbine rotor 204 and the turbine casing 205.

The turbine rotor 204 is coupled to a rotor 2 in the compressor 1 to be described below, and rotates around the rotational axis Ar together with the rotor 2.

In the following, a direction in which the rotational axis Ar extends is defined as an axial direction Da. Additionally, a radial direction having the rotational axis Ar as a reference is defined as a radial direction Dr. A direction away from the rotational axis Ar in the radial direction Dr is defined as an outer side in the radial direction Dr. A direction approaching the rotational axis Ar in the radial direction Dr is defined as an inner side in the radial direction Dr. Moreover, a peripheral direction having the rotational axis Ar as a reference is defined as a peripheral direction Dc.

Figure 3:
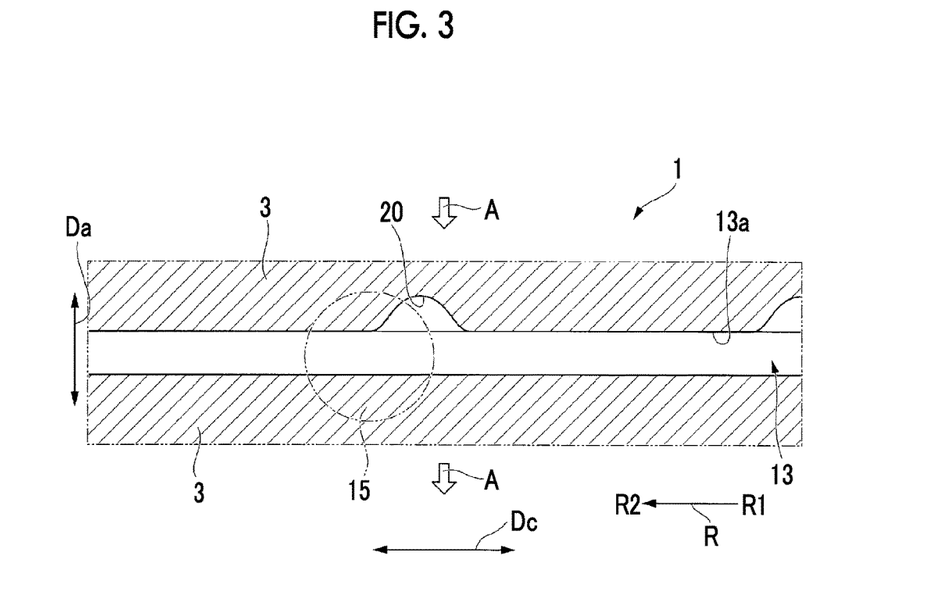
FIG. 3 is a view when the vicinity of a slot of the compressor related to the first embodiment of the invention is seen from a radial inner side, and a view as seen in the direction of arrow III of FIG. 2.

Additionally, in the present embodiment, a direction in which the rotor 2 rotates is defined as a rotational direction R. As for the rotational direction R, as illustrated in FIG. 3, a near side in the rotational direction is defined as a first side R1, and a deep side in the rotational direction is defined as a second side R2.

The plurality of combustors 202 are fixed to the turbine casing 5 at equal intervals from each other in the peripheral direction Dc around the rotational axis Ar.

Next, the compressor 1 will be described.

Figure 2:
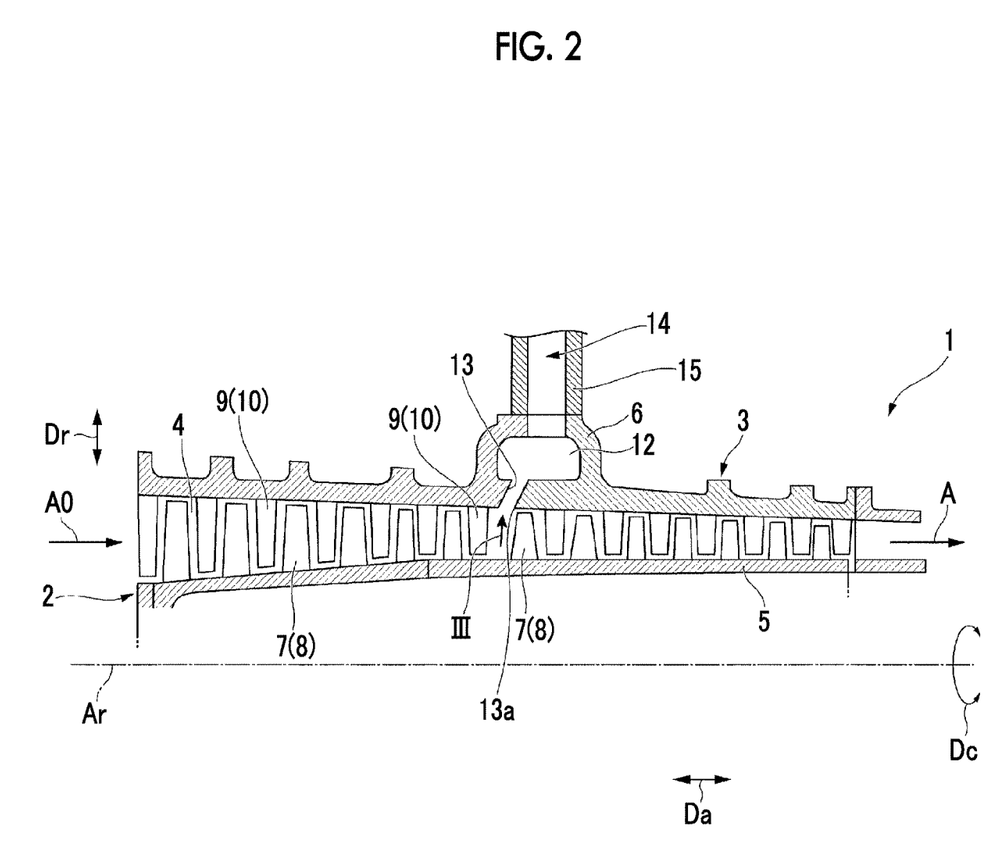
FIG. 2 is a sectional view of main parts of the compressor related to the first embodiment of the invention.

As illustrated in FIG. 2, the compressor 1 includes a rotor 2 that rotates around the rotational axis Ar, and a tubular rotor casing 3 that covers the rotor 2.

The rotor casing 3 demarcates an annular primary duct 4, through which the compressed air A flows, between the rotor casing and the rotor 2. Additionally, the rotor casing 3 has a plurality of compressor vane stages 9 provided at predetermined intervals in the axial direction Da on the surface thereof on the inner peripheral side.

Each compressor vane stage 9 has a plurality of compressor vanes 10. The plurality of compressor vanes 10 are annularly arranged at predetermined intervals from each other in the peripheral direction Dc around the rotational axis Ar, and constitutes one compressor vane stage 9. Each compressor vane 10 extends from the surface of the rotor casing 3 on the inner peripheral side toward the inner side in the radial direction Dr.

The rotor 2 has a rotor body 5 that extends in the axial direction Da, and a plurality of compressor blade stages 7 that are fixed to the outer periphery of the rotor body 5 and provided at predetermined intervals in the axial direction Da.

The rotor body 5 is a shaft-shaped member centered on the rotational axis Ar, and extends in the axial direction Da.

Each compressor blade stage 7 has a plurality of compressor blades 8. The plurality of compressor blades 8 are annularly arranged at predetermined intervals from each other in the peripheral direction Dc around the rotational axis Ar, and constitutes one compressor blade stage 7. Each compressor blade 8 extends from the outer periphery of the rotor body 5 toward the outer side in the radial direction Dr. The compressor blade stages 7 are respectively on the downstream sides of the compressor vane stages 9, whereby the compressor blade stages 7 and the compressor vane stages 9 are alternately provided side by side.

In this way, in the present embodiment, the compressor 1 is a multi-stage-type axial compressor in which external air A0 is taken into a primary duct 4 and stepwisely compressed by the plurality of compressor vane stages 9 and the plurality of compressor blade stages 7, and the compressed air A is generated.

The compressor 1 further includes an air bleed chamber casing 6 that is provided on the outer peripheral side of the rotor casing 3, and a plurality of air bleed tubes 15 that are connected to the air bleed chamber casing 6.

The air bleed chamber casing 6 is annularly formed around the rotational axis Ar so as to protrude from the rotor casing 3 to the outer side in the radial direction Dr. The air bleed chamber casing 6 demarcates an air bleed chamber 12 that becomes an annular space between the air bleed chamber casing and the rotor casing 3.

Additionally, a slot 13, which extends in the peripheral direction Dc and allows the air bleed chamber 12 and the primary duct 4 to communicate with each other, is formed in the rotor casing 3 such that an annular shape is formed around the rotational axis Ar between the compressor vane stage 9 and the compressor blade stage 7 adjacent to each other in the axial direction Da. In more detail, the slot 13 is formed to incline from the downstream toward the upstream along the axial direction Da as it goes from the inner side of the air bleed chamber 12 in the radial direction Dr toward the primary duct 4.

Each air bleed tube 15 is connected to the air bleed chamber casing 6 from the outer peripheral side, and extends to the outer side in the radial direction Dr. An air bleed pathway 14 that communicates with the air bleed chamber 12 is inside the air bleed tube 15.

The air bleed tube 15 is connected to the air bleed chamber casing 6 at predetermined intervals in the peripheral direction Dc. The number of air bleed tubes 15 varies depending on the model of the compressor 1.

In this way, the air A is bled from the primary duct 4 via the slot 13, the air bleed chamber 12, and the air bleed tubes 15. The bled air A is guided to the outside of the compressor 1.

Next, the slot 13 will be described in more detail.

As illustrated in FIG. 3, in the slot 13, the opening area of the opening 13a to the primary duct 4 is not uniform in the peripheral direction Dc.

That is, a large opening 20 in which the opening area of the opening 13a is locally larger than that at other positions in the peripheral direction is formed at a position in the peripheral direction Dc corresponding to the position of the opening 13a where each air bleed tube 15 is provided.

In the present embodiment, the large opening 20 is formed at a position on the first side R1 of the rotor 2 in the rotational direction R with respect to the position where the air bleed tube 15 is provided, in the peripheral direction Dc of the opening 13a. Hence, the same number of large openings 20 as the number of air bleed tubes 15 are formed.

The large opening 20 is formed such that the opening 13a is enlarged from the opening 13a toward the upstream side in the axial direction Da.

It is preferable that the large opening 20 is formed such that the opening 13a is smoothly enlarged from the opening 13a toward the upstream side in the axial direction Da. Additionally, the large opening 20 may be formed so as to be enlarged toward the downstream side as well as being formed from the opening 13a toward the upstream side. Additionally, the large opening 20 may be formed so as to be enlarged only toward the downstream side.

According to such a compressor 1, since the large opening 20 is formed in the opening 13a of the slot 13, the opening area of the opening 13a of the slot 13, that is, the flow path area of the air A in the opening 13a, becomes large at the position in the peripheral direction Dc on the first side R1 in the rotational direction R of the rotor 2 to the position where the air bleed tube 15 is provided.

Figure 4:
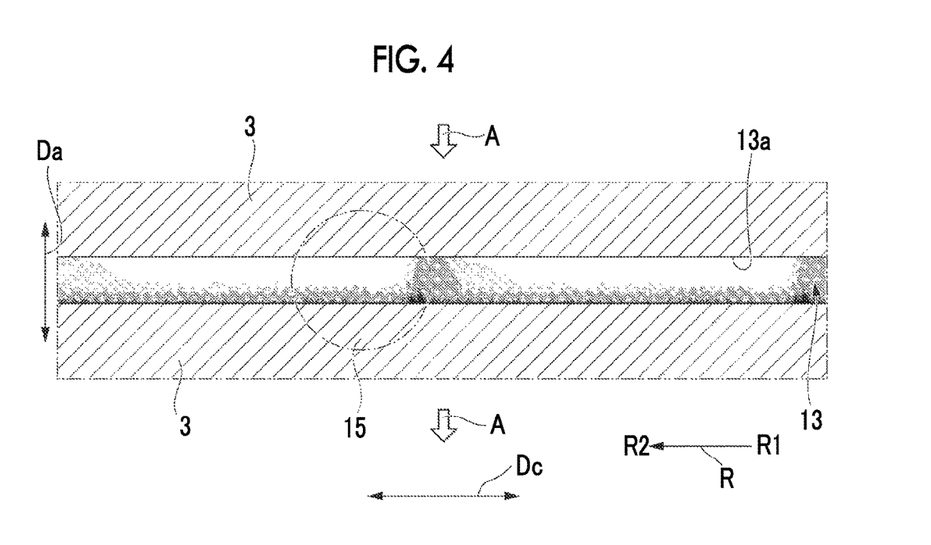
FIG. 4 is a view when the vicinity of the slot of the compressor in a case where the opening area of an opening of a slot is constant in a peripheral direction is seen from the radial inner side, and a view as seen from the same position as arrow III of FIG. 2. Additionally, the analysis results of flow rate distribution of air in the vicinity of the opening of the slot are illustrated by the shade of a color.

The analysis results of flow rate distribution of the air A in the opening 13a of the slot 13 when the opening area of the opening 13a of the slot 13 is constant in the peripheral direction, that is, when the opening area does not vary in the peripheral direction are illustrated in FIG. 4. In such a case, due to the air A having a swirling component through the rotation of the rotor 2, the distribution of the flow rate of the air A in the peripheral direction Dc occurs in the vicinity of the opening 13a of the slot 13.

A lighter-shaded portion illustrated in FIG. 4 is a portion with a small flow rate. Specifically, a darker-shaped portion illustrated in FIG. 4 is a portion with a large flow rate. As illustrated in FIG. 4, a phenomenon in which the flow rate of the air A becomes large is confirmed in the vicinity of the position in the peripheral direction Dc of the opening 13a corresponding to the position where the air bleed tube 15 is provided. Moreover, the phenomenon in which the flow rate of the air A becomes large is markedly seen on the first side R1 in the rotational direction R of the rotor 2, at the position in the peripheral direction in the opening 13a corresponding to the position where the air bleed tube 15 is provided.

In the present embodiment, by forming the above-described large opening 20, the flow rate of the air A to flow from the slot 13 toward the air bleed pathway 14 at this position can be suppressed to be small. Additionally, an increase in the flow rate of the air A resulting from the rotation of the rotor 2 can be suppressed within the primary duct 4 in the vicinity of the position in the peripheral direction Dc of the opening 13a corresponding to the position where the air bleed tube 15 is provided.

Additionally, the large opening 20 is formed in the opening 13a of the slot 13 to the primary duct 4. Hence, since the large opening 20 can be formed at a position that is easy to access from the inner peripheral side of the rotor casing 3, manufacturing is easy.

According to the compressor 1 of the present embodiment, the large opening 20 is formed in the opening 13a of the slot 13. Thus, manufacturing is easy, and costs can be controlled. Moreover, it is possible to make the flow rate of the air A uniform within the primary duct 4 in the vicinity of the slot 13 where the bleeding of the air A from the primary duct 4 is performed, and to increase a surge margin to suppress a decline in operation efficiency.

Second Embodiment

Figure 5:
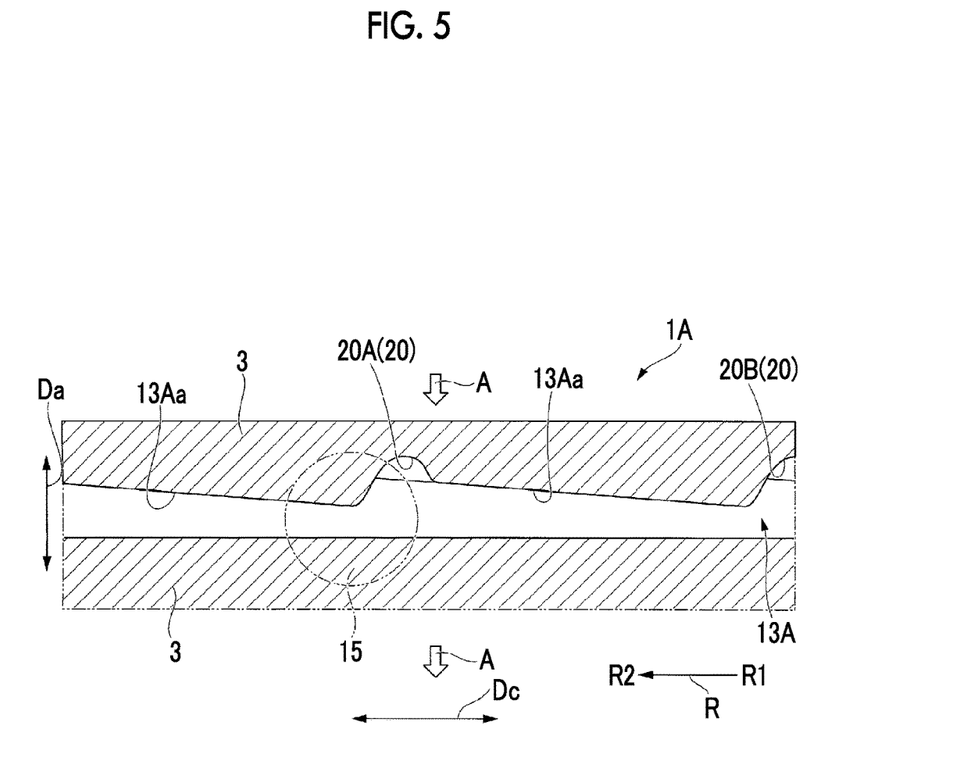
FIG. 5 is a view when a primary duct and a slot of a compressor related to a second embodiment of the invention is seen from a radial inner side, and a view as seen from the same position as arrow III of FIG. 2.

Next, a compressor 1A related to a second embodiment of the invention will be described with reference to FIG. 5.

The compressor 1A of the present embodiment is different from the first embodiment in the shape of an opening 13Aa of a slot 13A.

The opening 13Aa of the slot 13A is formed such that the opening area thereof decreases gradually from the large opening 20 toward the first side R1 in the rotational direction R.

That is, the width dimension of the opening 13Aa in the axial direction Da becomes narrower gradually from a first large opening 20 (20A) toward a second large opening (20B) more adjacent to the first side R1 in the rotational direction R of the rotor 2 than the large opening 20 (20A). In the present embodiment, the inner surface of the slot 13A on the upstream side inclines to the downstream side as it goes toward the first side R1 in the rotational direction R and thereby approaches the inner surface of the slot 13A on the downstream side, and the width dimension of the opening 13Aa in the axial direction Da becomes narrower.

As illustrated in FIG. 4, the flow rate of the air A to flow from the slot 13A (13) via the air bleed chamber 12 toward the air bleed tube 15 becomes the largest at the position in the peripheral direction Dc of the opening 13Aa corresponding to the position where the air bleed tube 15 is provided. Additionally, the flow rate of the air A to flow into the slot 13A (13) becomes smaller as it goes from the position in the peripheral direction of the opening 13Aa toward the first side R1 in the rotational direction R.

According to the compressor 1A of the present embodiment, the opening area of the opening 13Aa of the slot 13A is reduced from the large opening 20 toward the first side R1 in the rotational direction R so as to match such flow rate distribution of the air A. Thus, it is possible to more effectively make the distribution of the flow rate of the air A in the peripheral direction uniform in the vicinity of the opening 13Aa of the slot 13A.

In the present embodiment, the inner surface of the slot 13A on the downstream side may incline to the upstream side as it goes toward the first side R1 in the rotational direction R and thereby may approach the inner surface of the slot 13A on the upstream side, and the width dimension of the opening 13Aa in the axial direction Da may become narrower. Additionally, the surfaces of the slot 13A on both the upstream and downstream sides may incline to approach each other, and the width dimension of the opening 13Aa in the axial direction Da may become narrower.

Although the embodiments of the invention have been described above in detail, some design changes can also be made without departing from the technical idea of the invention.

For example, in the above-described embodiment, the large opening 20 of the slot 13 (13A) is formed in the opening 13a (13Aa). However, the width dimension of the slot 13 (13A) in the axial direction Da may be large over the whole region of the slot in the radial direction Dr, at the position in the peripheral direction Dc of the opening 13a (13Aa) where the large opening 20 is formed so as to be continuous with the large opening 20.

Additionally, in the above-described embodiments, the axial compressor 1 has been described as an example of the compressor. However, the configurations of the above-described embodiments can also be applied to other types of compressors, such as a centrifugal compressor.

INDUSTRIAL APPLICABILITY

According to the above compressor and gas turbine, the large opening is formed in the opening of the slot. Thus, it is possible to make the flow rate of a fluid uniform within the primary duct in the vicinity of the slot where the bleeding of the fluid from the primary duct is performed, while controlling costs, and to increase a surge margin to suppress a decline in operation efficiency.

REFERENCE SIGNS LIST 1, 1A: COMPRESSOR
2: ROTOR
3: ROTOR CASING
4: PRIMARY DUCT
5: ROTOR BODY
6: AIR BLEED CHAMBER CASING
7: COMPRESSOR BLADE STAGE
8: COMPRESSOR BLADE
9: COMPRESSOR VANE STAGE
10: COMPRESSOR VANE
12: AIR BLEED CHAMBER
13, 13A: SLOT
13a, 13Aa: OPENING
14: AIR BLEED PATHWAY
15: AIR BLEED TUBE
20: LARGE OPENING
R: ROTATIONAL DIRECTION
R1: FIRST SIDE IN ROTATIONAL DIRECTION
R2: SECOND SIDE IN ROTATIONAL DIRECTION
Ar: ROTATIONAL AXIS
Da: AXIAL DIRECTION
Dr: RADIAL DIRECTION
Dc: PERIPHERAL DIRECTION
A: AIR (COMPRESSED AIR, FLUID)
A0: EXTERNAL AIR
200: GAS TURBINE
202: COMBUSTOR
203: TURBINE
204: TURBINE ROTOR
205: TURBINE CASING
206: PRIMARY DUCT
F: FUEL
G: COMBUSTION GAS

The invention claimed is:

1. A multi-stage-type compressor comprising:
a rotor that rotates around an axis;
a rotor casing that encircles the rotor from an outer peripheral side and demarcates a primary duct for a fluid between the rotor casing and the rotor;
an air bleed chamber casing that is provided on the outer peripheral side of the rotor casing and demarcates an air bleed chamber communicating with the primary duct via a slot formed extending in a peripheral direction of the axis; and
a tube that is connected to the air bleed chamber casing from the outer peripheral side, and has an air bleed pathway leading the fluid within the air bleed chamber to an outside formed therein,
wherein, in the slot where an opening of the slot to the primary duct is formed, a large opening is formed such that the opening of the slot is enlarged from the opening of the slot in an axial direction of the rotor such that in the large opening, an opening area of the opening of the slot is larger at a position in the peripheral direction corresponding to a position where the tube is provided than the opening area at an other position in the peripheral direction of the opening of the slot.

2. The multi-stage-type compressor according to claim 1, wherein the large opening is formed in the slot at the position in the peripheral direction of the opening corresponding to the position where the tube is provided and on a first side in a rotational direction of the rotor at the position in the peripheral direction of the opening.

3. The multi-stage-type compressor according to claim 1, wherein the slot is formed such that the opening area decreases gradually toward the first side in the rotational direction of the rotor from the large opening.

4. A gas turbine comprising:
the multi-stage-type compressor according to claim 1 that compresses air as the fluid when the rotor rotates;

a combustor that combusts fuel in the compressed air compressed in the compressor to generate combustion gas; and a turbine that is driven with the combustion gas from the combustor.

\* \* \* \* \*